United States Patent
Shaw et al.

(10) Patent No.: US 10,310,916 B2
(45) Date of Patent: Jun. 4, 2019

(54) SCALABLE SPINLOCKS FOR NON-UNIFORM MEMORY ACCESS

(71) Applicant: INTEL CORPORATION, Santa Clara, CA (US)

(72) Inventors: Steven Mark Shaw, Crowthorne (GB); Hubert Nueckel, Redwood City, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/704,799

(22) Filed: Sep. 14, 2017

(65) Prior Publication Data

US 2019/0079807 A1   Mar. 14, 2019

(51) Int. Cl.
| | | |
|---|---|---|
| *G06F 12/00* | (2006.01) | |
| *G06F 9/52* | (2006.01) | |
| *G06F 9/50* | (2006.01) | |
| *G06F 12/14* | (2006.01) | |
| *G06F 13/00* | (2006.01) | |
| *G06F 13/28* | (2006.01) | |

(52) U.S. Cl.
CPC .......... *G06F 9/526* (2013.01); *G06F 9/5022* (2013.01); *G06F 12/1466* (2013.01); *G06F 2212/2542* (2013.01)

(58) Field of Classification Search
CPC .... G06F 9/526; G06F 9/5022; G06F 12/1466; G06F 2212/2542
See application file for complete search history.

(56) References Cited

U.S. PATENT DOCUMENTS

| 4,439,830 A | * | 3/1984 | Chueh | G06F 12/1475 |
| | | | | 711/164 |
| 4,965,719 A | * | 10/1990 | Shoens | G06F 9/52 |
| | | | | 707/E17.007 |
| 5,596,754 A | * | 1/1997 | Lomet | G06F 9/526 |
| | | | | 710/200 |
| 8,694,706 B2 | * | 4/2014 | Dice | G06F 9/526 |
| | | | | 710/200 |
| 2002/0087736 A1 | * | 7/2002 | Martin | G06F 9/4843 |
| | | | | 719/312 |
| 2003/0236817 A1 | * | 12/2003 | Radovic | G06F 9/526 |
| | | | | 718/107 |

(Continued)

*Primary Examiner* — Mark A Giardino, Jr.
(74) *Attorney, Agent, or Firm* — Finch & Maloney PLLC

(57) ABSTRACT

Techniques are disclosed to provide scalable spinlocks for non-uniform memory access (NUMA). In some examples, a global spinlock configured to protect access to a shareable resource is protected by multiple local spinlocks, which are each configured to control access to the global spinlock. In a multi-socket NUMA system, the global spinlock is allocated on one of the sockets, and the local spinlocks are distributed over the multiple sockets. In some embodiments, one local spinlock is allocated on each of the multiple sockets. In other embodiments, the multiple local spinlocks may be equally distributed over the NUMA sockets. When contention for the global spinlock is low, processes can attempt to directly acquire the global spinlock. In contrast, when contention for the global spinlock is high, processes need to first acquire one of the local spinlocks associated with the global spinlock before attempting to acquire the global spinlock.

25 Claims, 7 Drawing Sheets

(56) References Cited

U.S. PATENT DOCUMENTS

2004/0225742 A1* 11/2004 Loaiza ................... G06F 9/526
709/229
2013/0290967 A1* 10/2013 Calciu ................... G06F 9/526
718/102

* cited by examiner

| Spinlock ID 302 | ... | Globally Acquired Flag 304 | Locally Acquired Flag 306 | ... |

SCALABLE SPINLOCKS FOR NON-UNIFORM MEMORY ACCESS

BACKGROUND

A multi socket non-uniform memory access (NUMA) system includes multiple processor sockets with locally attached memory. In these NUMA multi-socket systems, the system memory is distributed amongst the multiple processor sockets, and each processor socket manages an individual subset (e.g., the locally attached memory) of the overall pool of system memory. A result of the distributed nature of the system memory is that the memories may have a different latency or "temporal cost" to accessing the memory. That is, a processing core within a processor may have lower latency access to the memory that is local to that processor (the memory attached to the processor) as compared to access to memory that is non-local to the processor (e.g., memory attached to a different processor).

Many enterprise applications, such as relational database management systems (RDBMS), are installed on systems having 2 to 4 processor sockets. Demands for increased processing have created a need for applications to scale-up for high count multi-socket systems (e.g., systems having 8, 16, 32, and more processor sockets).

BRIEF DESCRIPTION OF THE DRAWINGS

The accompanying drawings are not intended to be drawn to scale. In the drawings, each identical or nearly identical component that is illustrated in various figures is represented by a like numeral, as will be appreciated when read in context.

FIG. 3 illustrates selected fields of a global spinlock structure, arranged in accordance with at least some embodiments described herein.

Figure 1:
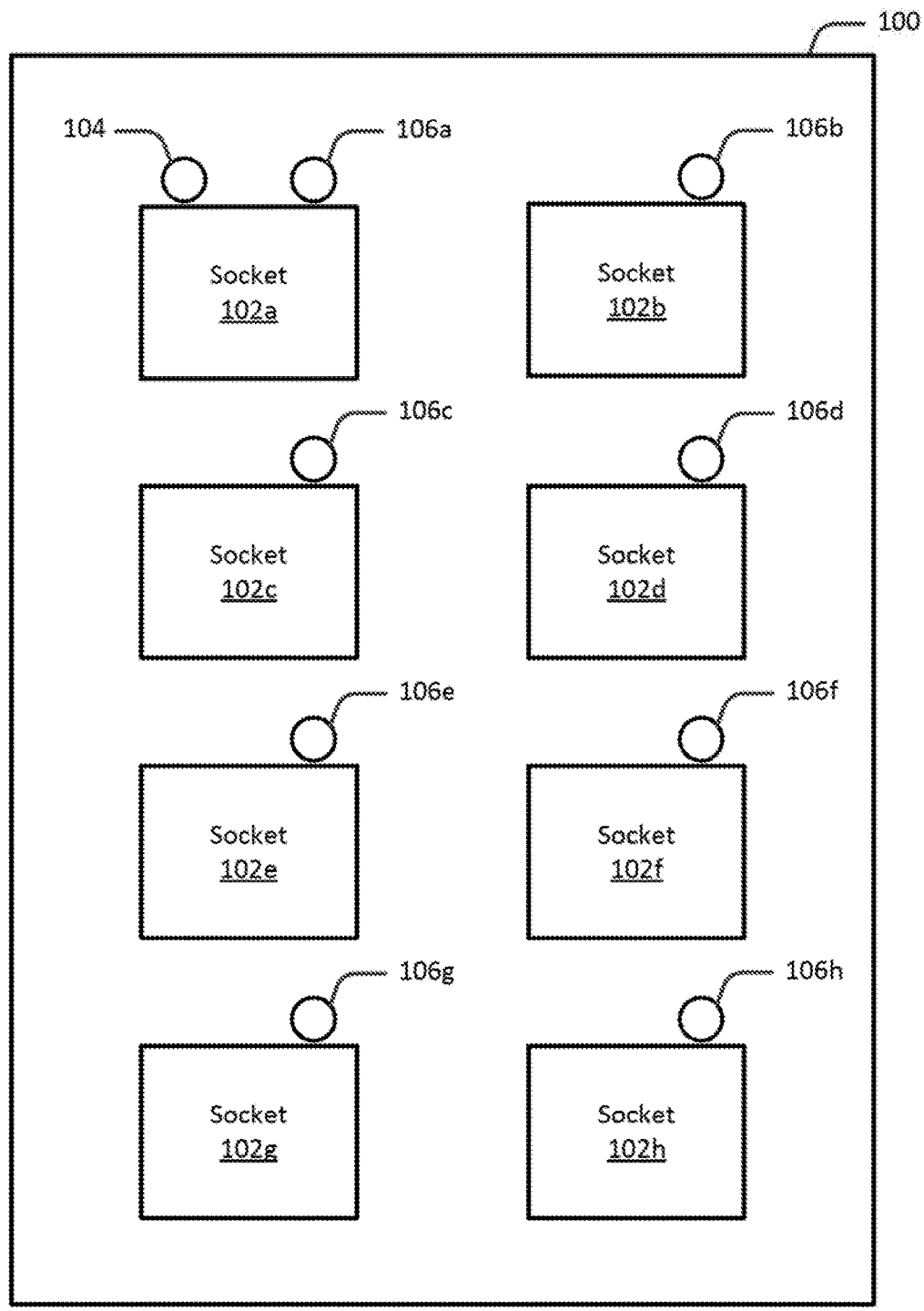
FIG. 1 illustrates an example deployment of scalable spinlocks in a multi-socket system, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

DETAILED DESCRIPTION

Locks (latches) can be used to control access to sharable resources. A lock is a synchronization mechanism for enforcing limits on access to a sharable resource, and is designed to enforce a mutual exclusion concurrency control policy. For example, a lock may be deployed to protect the integrity of a sharable resource. A process (or a thread) that requires access to a protected resource acquires the lock before accessing the protected resource. Once the process has acquired the lock, the protected resource becomes "locked" (the lock is locked), and the process is provided exclusive access to the protected resource. Any other process that requires access to the locked protected resource must wait. When exclusive access to the locked protected resource is no longer needed, the process "holding" the lock (i.e., the process that acquired the lock) releases the lock, which "unlocks" the protected resource (unlocks the lock). Other processes may then acquire the lock in order to obtain exclusive access to the protected resource. A spinlock is a lock which causes a process trying to acquire the spinlock to simply wait in a loop (e.g., spin) while repeatedly checking to see whether the spinlock is available. Since the process remains active (e.g., consuming a large percentage of the processing core on which the process is running) but is not performing a useful task while spinning, spinlocks are suited for instances where the anticipated waiting (spinning) time is very short (e.g., on the order of nanoseconds).

As previously noted, on high count multi-socket systems, the processing cores on a socket can access the memory that is local to the core or also access the memory of a remote (different) core at a higher latency. For applications to scale on these higher count multi-socket systems, it is necessary to successfully synchronize access to sharable resources across the multiple sockets. On systems with large socket counts, there can be considerable differences in latency. A consequence of the different latencies is that processing cores running on a socket local to a spinlock experience a local preference for the spinlock as compared to processing cores running on a socket that is not local to the spinlock. This can result in the processing cores running on the socket that is not local to the spinlock being "starved" of the spinlock (and the shareable resource being protected by the spinlock) during periods of increased spinlock contention. Additionally, there is the challenge of spinlock migration when multiple processing cores on different sockets attempt to acquire the same spinlock, which results in the transfer of cache lines across the system, as well as invalidation of the cache lines on processing cores attempting to acquire the same spinlock. This may result in an increase in spinlock contention on high count multi-socket systems, and ultimately a lack of scalability where this contention and/or starvation is of a shareable resource that may be important to scalability. Thus, scaling of spinlocks is a key aspect to scaling applications, including enterprise applications, on high count multi-socket systems.

To this end, techniques are disclosed to provide scalable spinlocks for non-uniform memory access (NUMA). Scalability is achieved by surrounding a global spinlock with multiple local spinlocks each configured to control access to the global spinlock. In this manner, the global spinlock is protected by the multiple local spinlocks. For example, in a NUMA architecture, the global spinlock is allocated on one of the NUMA sockets and is protected by multiple local spinlocks. In some embodiments, one local spinlock is allocated on each NUMA socket. In other embodiments, the multiple local spinlocks may be equally distributed over the NUMA sockets. Similar to current implementations of spinlocks, processes can continue to directly acquire the global spinlock without firstly acquiring a local spinlock. This ensures the same level of performance as the current implementations when the spinlock is not busy (contention for the spinlock is low). Once a process directly acquires the global spinlock, the process sets a flag to indicate that the global spinlock was directly acquired, and not through one of the local spinlocks that are protecting the global spinlock. For example, a flag that indicates "globally acquired" may be set to indicate that the global spinlock was directly acquired. Other processes attempting to acquire the global spinlock can read the flag that indicates that the global spinlock was globally acquired. In this state (where the global spinlock was directly acquired), other processes can also attempt to directly acquire the global spinlock. However, once a process has spun a predetermined number of times attempting to acquire the global spinlock without success, the process then attempts to acquire one of the local spinlocks that are protecting the global spinlock. This local spinlock (i.e., the local spinlock the process is attempting to acquire) is randomly chosen, and may not necessarily be the local spinlock on the same socket on which the process is executing. Selection of a local spinlock at random ensures that preference is not given to processes running on the same socket as the global spinlock (e.g., the socket on which the global spinlock is allocated). If the process fails to acquire a local spinlock, the process attempts to acquire another local spinlock that is protecting the global spinlock. This local spinlock is also chosen at random. Once the process acquires and holds a local spinlock that is protecting the global spinlock, the process can then attempt to acquire the global spinlock. If the process succeeds in acquiring the global spinlock, the process sets a flag to indicate that the global spinlock was acquired and is being held by a local spinlock holder. For example, a flag that indicates "locally acquired" may be set to indicate that the global spinlock was acquired by a local spinlock holder (acquired through a local spinlock that is protecting the global spinlock). Any process examining the global spinlock and reading the flag that indicates that the global spinlock is held by a local spinlock holder (that the global spinlock was locally acquired), then attempts to acquire a local spinlock first without attempting to directly acquire the global spinlock. In some embodiments, a global spinlock may be configured to be only be acquirable by local spinlock holders. For example, if the system is known to be running in a condition of high global spinlock contention, a system administrator may configure the system to require processes to acquire a local spinlock before attempting to acquire a global spinlock.

One of many technical advantages is that, once the workload scales and results in global spinlock contention in a system, the system automatically adapts its approach in how global spinlocks are acquired. For example, in a situation of no contention for the global spinlock, the system operates in a manner similar to current solutions. However, once contention for the global spinlock is detected, the system automatically adapts by requiring acquisition of a local spinlock to reduce contention on the global spinlock. In the case where one local spinlock is allocated on each NUMA socket, this ensures that no more than the number of processes equal to the NUMA sockets will be attempting to acquire the global spinlock at the same time. Additionally, as the local spinlocks are randomly chosen, no process is provided preferential access by running on the same socket as the global spinlock. If the system is known to be running in a situation of high latch contention such as 8 or more sockets the system can easily be adapted to one where the local latch is always acquired before the global latch through a system parameter.

Turning now to the figures, FIG. 1 illustrates an example deployment of scalable spinlocks in a multi-socket system 100, arranged in accordance with at least some embodiments described herein. Multi-socket system 100 is a NUMA system where memory access time is dependent on location or distance of the memory from a processor. As depicted, multi-socket system 100 includes eight sockets 102a-102h. Sockets 102a-102h may be collectively referred to herein as sockets 102, or singularly referred to herein as a socket 102. Sockets 102 may be communicatively coupled to each other. For example, each socket 102 may be connected to each of the other sockets 102 via a point-to-point Intel® QuickPath Interconnect (QPI) link. QPI is one suitable interconnect architecture, and other interconnect architectures are envisioned, such as other point-to-point architectures, ring architectures, and bus architectures, to name a few examples. The number of sockets depicted in multi-socket system 100 is for illustration, and those skilled in the art will appreciate that there may be a different number of sockets. For example, multi-socket system 100 may include a smaller number of sockets, such as six, four, or less, or a larger number of sockets, such as sixteen, thirty-two, or more.

Multi-socket system 100 also includes a global spinlock 104 and eight local spinlocks 106a-106h. Local spinlocks 106a-106h may be collectively referred to herein as local spinlocks 106, or singularly referred to herein as a local spinlock 106. Global spinlock 104 is allocated on one of the sockets 102, specifically, socket 102a, to control access to a shareable resource. Each local spinlock 106 is allocated on a respective socket 102, to control access to global spinlock 106. In operation, global spinlock 104 is protected by local spinlocks 106, as will be explained in greater detail below. Global spinlock 104 and local spinlocks 106 may be implemented in hardware, software, or a combination of both hardware and software, according to various embodiments. In some embodiments, global spinlock 104 and local spinlocks 106 are each test and test-and-set spinlocks. A test and test-and-set spinlock utilizes an entry protocol (e.g., test) to wait for the lock to become free. Once the entry protocol indicates that the lock is free, a test-and-set operation is utilized to attempt to acquire the lock. The objective of the test and test-and-set spinlock is not to spin in test-and-set, but increase the likelihood of a successful test-and-set by utilizing the entry protocol. In other embodiments, global spinlock 104 and local spinlocks 106 are each test-and-set spinlocks. A test-and-set spinlock utilizes a single shared memory location for synchronization. The test-and-set instruction is an instruction used to write "1" (set) to a memory location, and returns the value from the memory location in a single atomic operation. The lock is acquired if the value returned from the memory location is "0", otherwise, a loop is entered (e.g., spin) while waiting to acquire the lock.

Figure 2:
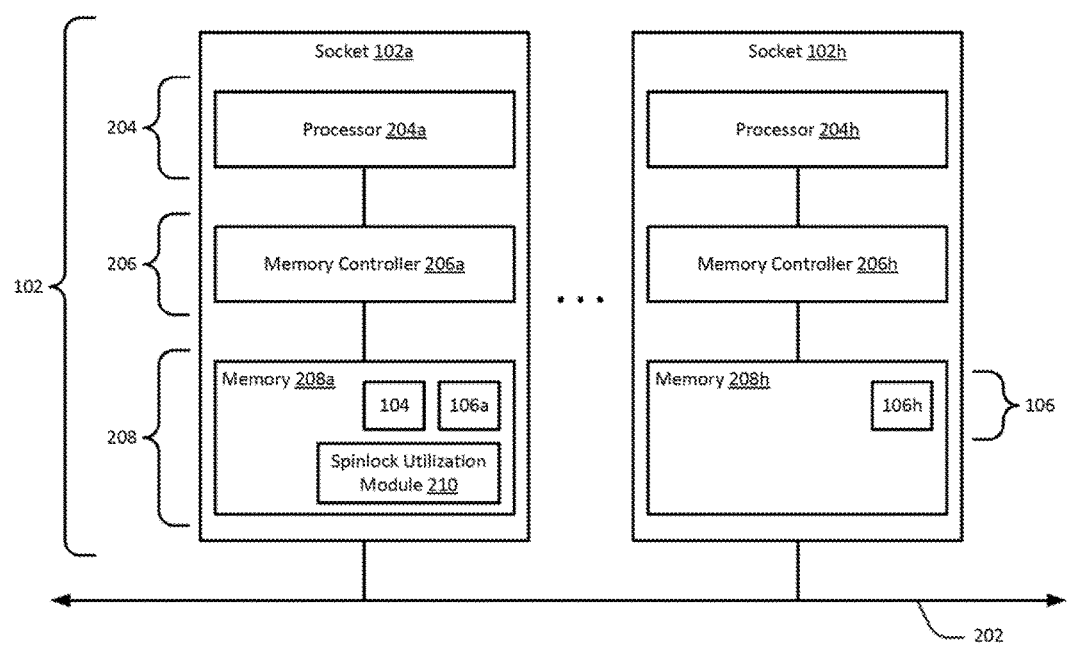
FIG. 2 illustrates selected components of the multi-socket system of FIG. 1, arranged in accordance with at least some embodiments described herein.

FIG. 2 illustrates selected components of multi-socket system 100 of FIG. 1, arranged in accordance with at least some embodiments described herein. As depicted, sockets 102 are each communicatively coupled to an interconnect 202. As described above, interconnect 202 may be a point-to-point QPI link. Sockets 102a-102h include processors 204a-204h, respectively. Processors 204a-204h may be collectively referred to herein as processors 204, or singularly referred to herein as a processor 204. Processors 204a-204h are communicatively coupled to respective memory controllers 206a-206h, which are communicatively coupled to respective local memories 208a-208h. Memory controllers 206a-206h may be collectively referred to herein as memory controllers 206, or singularly referred to herein as a memory controller 206. Likewise, memories 208a-208h may be collectively referred to herein as memories 208, or singularly referred to herein as a memory 208. In various embodiments, additional components (not illustrated) or a subset of the illustrated components can be employed without deviating from the scope of the disclosed embodiments.

Processor 204 may include any processing unit suitable for use in a multi-socket system, such as an Intel® PentiumD processor, an Intel® Xeon® processor, or any other suitable single core or multi-core processor. Processor 204 may include any number of processors and/or processor cores configured to, individually or collectively, perform or direct performance of any number of operations described in the present disclosure. Memory controller 206 may be configured to control and manage the flow of data going to and from communicatively coupled memory 208. Memory controller 206 may be integrated into and be a part of respective processor 204. For example, memory controller 206a may be integrated into and be a part of processor 204a, memory controller 206b may be integrated into and be a part of processor 204b, and so on. Memory 208 is socket local memory in that memory 208 is locally attached to respective socket 102. For example, memory 208a is locally attached to socket 102a, memory 208b is locally attached to socket 102ab, and so on. Memory 208 may include volatile memory, non-volatile memory, or a combination of volatile and non-volatile memory. Memory 208 may be a portion of the overall system memory.

Memory 206a may include a spinlock utilization module 210. Spinlock utilization module 210 may be a software application, such as a database server application, that utilizes spinlocks to control access to sharable resources. In an example operation of the scalable spinlocks as described herein, spinlock utilization module 210, running as a process on processor 204a, determines that there are eight sockets 102a-102h, and allocates global spinlock 104 configured to control access to a specific region of memory 208a on socket. This is shown by global spinlock 104 being included in memory 208a. Contemporaneous with the allocation of global spinlock 104, spinlock utilization module 210 allocates one local spinlock 106 on each socket 102. This is shown by local spinlocks 106a-106h being included in memories 208a-208h, respectively. Each local spinlock 106 is configured to control access to global spinlock 104. Those skilled in the art will appreciate that spinlock utilization module 210 may allocate one or more other global spinlocks, including multiple local spinlocks associated with each global spinlock, to protect other sharable resources in addition to global spinlock 104 and associated local spinlocks 106. Similarly, one or more other processes may likewise each allocate one or more global spinlocks, including multiple local spinlocks associated with each global spinlock, to protect sharable resources on multi-socket system 100. Accordingly, global spinlock 104 and associated local spinlocks 106 are provided as an example of one scalable spinlock to protect one sharable resource on multi-socket system 100, and multi-socket system 100 may include a large number of global spinlocks and associated local spinlocks in addition to global spinlock 104 and associated local spinlock 106.

In a NUMA system such as multi-socket system 100, a process running on a core in a socket (e.g., socket 102a) can access all of the memory in multi-socket system 100. However, this process can access the local memory attached to the socket the process is running on (e.g., memory 208a managed by memory controller 206a on socket 102a) much quicker. If this process accesses remote memory (e.g., memory attached to a different socket), the process needs to access the remote memory via the memory controller on another socket, which adds extra computation work and makes the access slower.

Figure 3:
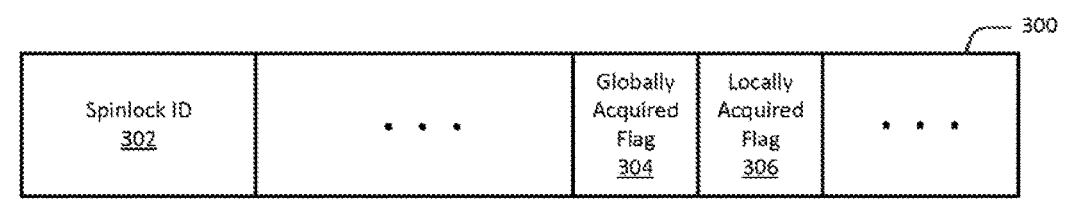

FIG. 3 illustrates selected fields of an example global spinlock structure 300, arranged in accordance with at least some embodiments described herein. Global spinlock structure 300 is augmented with indicators to indicate whether the global spinlock is globally acquired or locally acquired. As depicted, global spinlock structure 300 may include a spinlock ID 302, a globally acquired flag 304, and a locally acquired flag 306. Spinlock ID 302 is an identifier that uniquely identifies a global spinlock instance. Globally acquired flag 304 is a flag that, when set, indicates that the global spinlock is directly acquired, and not though a local spinlock. A globally acquired global spinlock was directly acquired by a process without the process having to first acquire a local spinlock. Locally acquired flag 306 is a flag that, when set, indicates that the global spinlock is acquired by a local spinlock holder. A locally acquired global spinlock was acquired indirectly by a process by first having to acquire a local spinlock that is protecting the global spinlock. Global spinlock structure 300 may include other information such as information as to whether the global spinlock is "locked" or "unlocked", information as to whether the global spinlock is being held by any process, and information as to whether the global spinlock is being held by the current process, to name a few examples.

Figure 4:
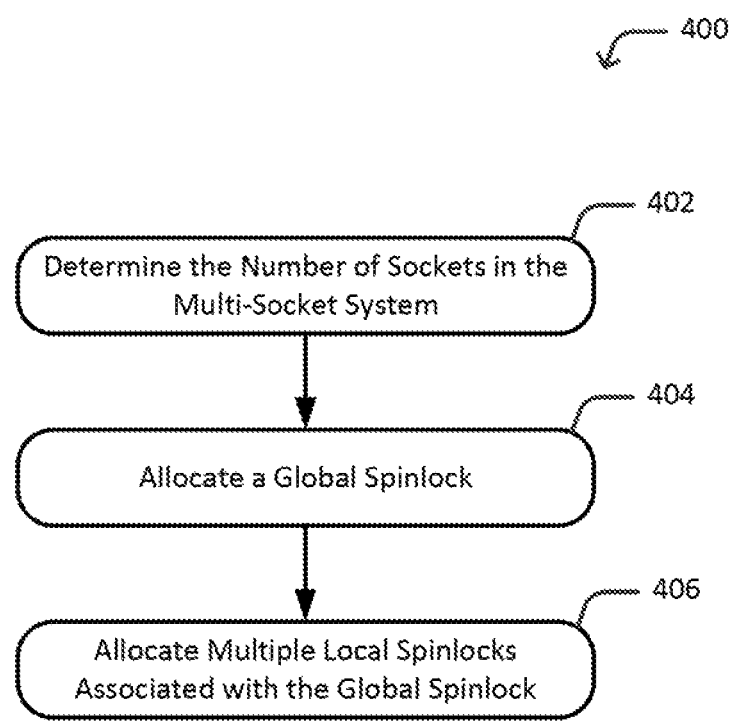
FIG. 4 is a flow diagram that illustrates an example process to deploy scalable spinlocks to protect a sharable resource, arranged in accordance with at least some embodiments described herein.

FIG. 4 is a flow diagram 400 that illustrates an example process to deploy scalable spinlocks for a sharable resource, arranged in accordance with at least some embodiments described herein. The operations, functions, or actions illustrated by the example process of flow diagram 400 may in some embodiments be performed by multi-socket system 100 and, more particularly, spinlock utilization module 210 of FIG. 2. The operations, functions, or actions described in the respective blocks of the example process may also be stored as computer-executable instructions in a computer-readable medium, such as memory 208 of socket 102. However, it will be appreciated that the example process of flow diagram 400 may be executed by processes other than spinlock utilization module 210.

As depicted by flow diagram 400, the example process to deploy scalable spinlocks to protect a sharable resource may begin with block 402, where spinlock utilization module 210 (an executing process of spinlock utilization module 210) determines the number of sockets in the multi-socket system in which spinlock utilization module 210 is running on. For example, the number of sockets may be determined using underlying services provided by the multi-socket system.

Block 402 may be followed by block 404 where spinlock utilization module 210 allocates a global spinlock that is configured to control access to a shareable resource. Examples of sharable resource include, without limitation, memory locations, interfaces, devices, etc. In some embodiments, spinlock utilization module 210 may allocate the global spinlock on the socket on which spinlock utilization module 210 is running on. In other embodiments, spinlock utilization module 210 may allocate the global spinlock on a different socket than the socket on which spinlock utilization module 210 is running on. In a more general sense, the global spinlock may be allocated on any one of the sockets.

Block 404 may be followed by block 406 where spinlock utilization module 210 allocates multiple local spinlocks associated with the allocated global spinlock. Each of the multiple local spinlocks is configured to control access to the associated global spinlock. In some embodiments, spinlock utilization module 210 allocates a number of spinlocks to equal the number of sockets, and allocates one local spinlock on each socket of the multi-socket system. For example, in the case of multi-socket system 100, spinlock utilization module 210 allocates eight local spinlocks, one local spinlock on each socket 102. In some embodiments, spinlock utilization module 210 may allocate a number of spinlocks different than the number of sockets, and distribute the number of spinlocks amongst the sockets. For example, spinlock utilization module 210 may equally distribute the local spinlocks amongst the sockets. Spinlock utilization module 210 may iterate blocks 402 and 404 to allocate scalable spinlocks (a global spinlock and associated multiple local spinlocks) to control access to other sharable resources, as appropriate.

Those skilled in the art will appreciate that, for this and other processes and methods disclosed herein, the functions performed in the processes and methods may be implemented in differing order. Additionally or alternatively, two or more operations may be performed at the same time. Furthermore, the outlined actions and operations are only provided as examples, and some of the actions and operations may be optional, combined into fewer actions and operations, or expanded into additional actions and operations without detracting from the essence of the disclosed embodiments.

Figure 5A:
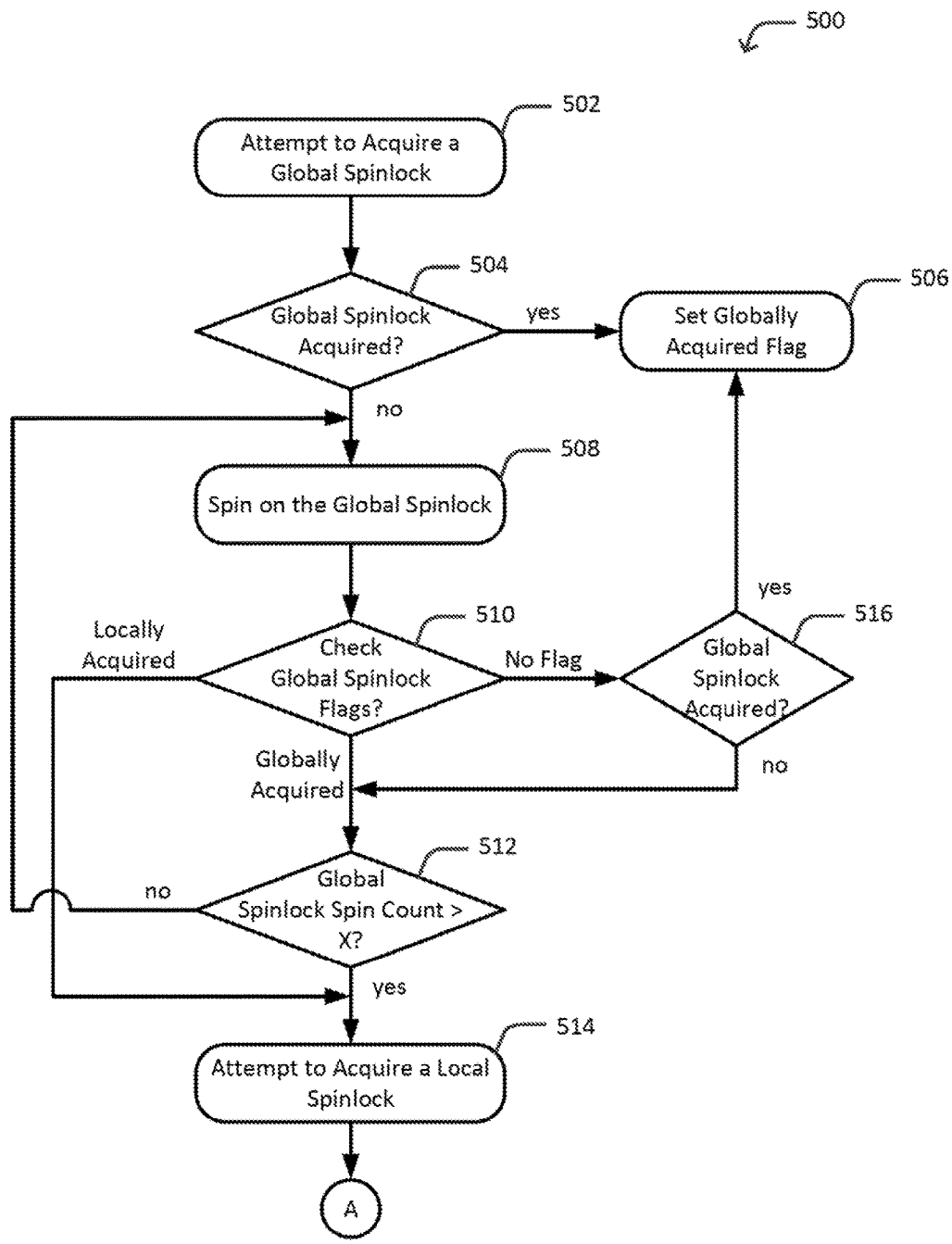
FIGS. 5A and 5B are a flow diagram that illustrates an example process to acquire a global spinlock protecting a sharable resource, arranged in accordance with at least some embodiments described herein.
Figure 5B:
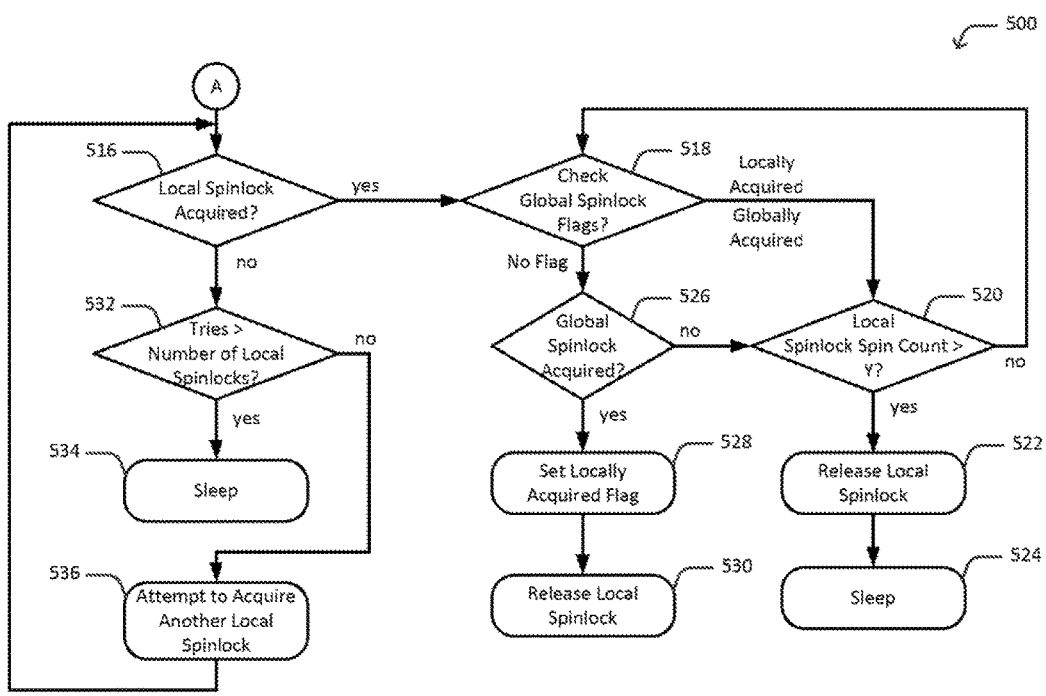

FIGS. 5A and 5B are a flow diagram 500 that illustrates an example process to acquire a global spinlock for a sharable resource, arranged in accordance with at least some embodiments described herein. The operations, functions, or actions illustrated by the example process of flow diagram 500 may in some embodiments be performed by multi-socket system 100 and, more particularly, spinlock utilization module 210 of FIG. 2. The operations, functions, or actions described in the respective blocks of the example process may also be stored as computer-executable instructions in a computer-readable medium, such as memory 208 of socket 102. However, it will be appreciated that the example process of flow diagram 500 may be executed by processes other than spinlock utilization module 210.

As depicted by flow diagram 500, the example process to acquire a global spinlock protecting a sharable resource may begin with block 502, where spinlock utilization module 210 (an executing process of spinlock utilization module 210) attempts to acquire (globally acquire) a global spinlock. For example, the global spinlock may be controlling access to a sharable resource, and spinlock utilization module 210 may attempt to acquire the global spinlock in order to access the sharable resource.

Block 502 may be followed by decision block 504 where spinlock utilization module 210 checks to determine whether spinlock utilization module 210 acquired (globally acquired) the global spinlock. If spinlock utilization module 210 determines that it has acquired the global spinlock, decision block 504 may be followed by block 506 where spinlock utilization module 210 sets a globally acquired flag to indicate that the global spinlock was directly acquired without having to first acquire one of the associated local spinlocks. In this instance, the global spinlock is locked, and spinlock utilization module 210 acquires exclusive use of the shareable resource. Spinlock utilization module 210 may release the global spinlock when spinlock utilization module 210 no longer needs exclusive access to the shareable resource.

Otherwise, if, at decision block 504, spinlock utilization module 210 determines that it has not acquired the global spinlock (spinlock utilization module 210 was unsuccessful in acquiring the global spinlock), decision block 504 may be followed by block 508 where spinlock utilization module 210 spins on the global spinlock. That is, spinlock utilization module 210 spins while repeatedly attempting to acquire the global spinlock.

Accordingly, block 508 may be followed by decision block 510, where spinlock utilization module 210 checks the globally acquired flag and the locally acquired flag of the global spinlock. If, at decision block 510, spinlock utilization module 210 determines that the globally acquired flag is set (the global spinlock is being held by a process that directly acquired the global spinlock), decision block 510 may be followed by decision block 512, where spinlock utilization module 210 checks to determine whether spinlock utilization module 210 has spun a specific number of times, X, attempting to acquire the global spinlock. The specific number, X, specifies a limit to the number of spins a process can make attempting to directly acquire the global spinlock. The specific number, X, serves as a limit so that a process does not spin indefinitely attempting to directly acquire the global spinlock. The specific number, X, may be set by a user, such as the programmer of spinlock utilization module 210.

If, at decision block 512, spinlock utilization module 210 determines that it has not spun in excess of the allotted specific number, X, then decision block 512 may be followed by block 508, which operation is described above. In this instance, spinlock utilization module 210 can continue to spin on the global spinlock (continue spinning attempting to acquire the global spinlock). Otherwise, if spinlock utilization module 210 determines that it has spun in excess of the allotted specific number, X, then decision block 512 may be followed by block 514, where spinlock utilization module 210 attempts to acquire a local spinlock associated with the global spinlock. In this instance, spinlock utilization module 210 can no longer continue spinning on the global spinlock (cannot continue spinning attempting to acquire the global spinlock), but needs to first acquire one of the local spinlocks associated with the global spinlock. The local spinlock associated with the global spinlock is configured to protect access to the global spinlock. In some embodiments, the local spinlock is randomly selected from amongst the multiple local spinlocks associated with the global spinlock. For example, the processor on which spinlock utilization module 210 is executing may provide a processor instruction (CPU instruction) that may be utilized to randomly select one of the local spinlocks.

With reference again to decision block 510, if spinlock utilization module 210 determines that the locally acquired flag is set (the global spinlock is being held by a process that first acquired one of the local spinlocks associated with the global spinlock), decision block 510 may be followed by block 514, where spinlock utilization module 210 attempts to acquire a local spinlock associated with the global spinlock. In this instance, spinlock utilization module 210 knows that it needs to first acquire one of the local spinlocks associated with the global spinlock before attempting to acquire the global spinlock. The locally acquired flag being set indicates to spinlock utilization module 210 that contention for the global spinlock is high, and that the global spinlock is only acquirable by local spinlock holders.

With reference again to decision block 510, if spinlock utilization module 210 determines that the globally acquired flag and the locally acquired flag are not set (the global spinlock is available), decision block 510 may be followed by decision block 516, where spinlock utilization module 210 checks to determine whether spinlock utilization module 210 acquired the global spinlock. In this instance, spinlock utilization was spinning attempting to acquire the global spinlock. Moreover, other processes in addition to spinlock utilization module 210 may have been attempting to acquire the global spinlock. If spinlock utilization module 210 determines that it has acquired the global spinlock, decision block 516 may be followed by block 506 where spinlock utilization module 210 sets a globally acquired flag to indicate that the global spinlock was directly acquired without having to first acquire one of the associated local spinlocks. Otherwise, if spinlock utilization module 210 determines that it has not acquired the global spinlock (spinlock utilization module 210 was unsuccessful in acquiring the global spinlock), decision block 516 may be followed by decision block 512, where spinlock utilization module 210 checks to determine whether spinlock utilization module 210 has spun in excess of the allotted specific number, X, attempting to acquire the global spinlock.

With reference again to block 514, block 514 may be followed by decision block 516, where spinlock utilization module 210 checks to determine whether spinlock utilization module 210 has acquired the local spinlock. If spinlock utilization module 210 determines that it has acquired the local spinlock, then decision block 516 may be followed by decision block 518, where spinlock utilization module 210 checks the globally acquired flag and the locally acquired flag of the global spinlock (the global spinlock being protected by the local spinlock). If, at decision block 518, spinlock utilization module 210 determines that either the globally acquired flag is set (the global spinlock is being held by a process that directly acquired the global spinlock) or the locally acquired flag is set (the global spinlock is being held by a process that first acquired one of the local spinlocks associated with the global spinlock), decision block 518 may be followed by decision block 520, where spinlock utilization module 210 checks to determine whether spinlock utilization module 210 has spun a specific number of times, Y, attempting to acquire the global spinlock. The specific number, Y, specifies a limit to the number of spins a process holding a local spinlock can make attempting to acquire the global spinlock. The specific number, Y, serves as a limit so that a process holding a local spinlock does not spin indefinitely attempting to acquire the global spinlock as a local spinlock holder. The specific number, Y, may be set by a user, such as the programmer of spinlock utilization module 210.

If, at decision block 520, spinlock utilization module 210 determines that it has not spun in excess of the allotted specific number, Y, then decision block 520 may be followed by decision block 518, which operation is described above. In this instance, spinlock utilization module 210 can continue to spin checking the globally acquired flag and the locally acquired flag of the global spinlock. Otherwise, if spinlock utilization module 210 determines that it has spun in excess of the allotted specific number, Y, then decision block 520 may be followed by block 522, where spinlock utilization module 210 releases the local spinlock that was acquired and is being held by spinlock utilization module 210. In this instance, spinlock utilization module has spun the allotted number of times trying to acquire the global spinlock as a holder of a local spinlock, and cannot make any more attempts trying to acquire the global spinlock as a holder of a local spinlock.

Block 522 may be followed by block 524, where spinlock utilization module 210 sleeps (enters a sleep state) as a consequence of not being able to acquire the global spinlock as a holder of a local spinlock. The sleep state may be defined by a period of time or clock cycles. The sleep state may also involve a back-off algorithm that, if a sleep has previously occurred, spinlock utilization module 210 will sleep for longer period of time on subsequent sleeps.

Otherwise, if, at decision block 518, spinlock utilization module 210 determines that the globally acquired flag and the locally acquired flag are not set (the global spinlock is available), decision block 518 may be followed by decision block 526, where spinlock utilization module 210 checks to determine whether spinlock utilization module 210 acquired (locally acquired) the global spinlock. In this instance, spinlock utilization was spinning attempting to acquire (locally acquire) the global spinlock as a local spinlock holder. Moreover, other processes in addition to spinlock utilization module 210 may have been attempting to acquire the global spinlock. If spinlock utilization module 210 determines that it has acquired the global spinlock, decision block 526 may be followed by block 528 where spinlock utilization module 210 sets a locally acquired flag to indicate that the global spinlock was not directly acquired, but acquired by first acquiring one of the associated local spinlocks. That is, the global spinlock was acquired by a local spinlock holder. Block 528 may be followed by block 530, where spinlock utilization module 210 releases the local spinlock that was acquired and is being held by spinlock utilization module 210. Spinlock utilization module 210 can release the local spinlock as spinlock utilization module 210 has successfully acquired the global spinlock.

Otherwise, if, at decision block 526, spinlock utilization module 210 determines that it has not acquired the global spinlock (spinlock utilization module 210 was unsuccessful in acquiring the global spinlock as a local spinlock holder), decision block 526 may be followed by decision block 520, where spinlock utilization module 210, which operation is described above. In this instance, spinlock utilization module 210 checks to determine whether spinlock utilization module 210 has spun in excess of the allotted specific number, Y, attempting to acquire the global spinlock as a local spinlock holder.

With reference again to decision block 516, if spinlock utilization module 210 determines that it was unsuccessful in acquiring the local spinlock, decision block 516 may be followed by decision block 532, where spinlock utilization module 210 checks to determine whether there spinlock utilization module 210 attempted to acquire all of the local spinlocks associated with the global spinlock. That is, spinlock utilization module 210 checks to determine whether there is another of the multiple local spinlocks that spinlock utilization module 210 can attempt to acquire. If spinlock utilization module 210 determines that it has attempted to acquire all of the local spinlocks associated with the global spinlock, decision block 532 may be followed by block 534, where spinlock utilization module 210 sleeps (enters a sleep state) as a consequence of not being able to acquire any of the local spinlocks associated with the global spinlock (not being able to acquire any of the local spinlocks that is protecting access to the global spinlock).

Otherwise, if spinlock utilization module 210 determines that there is another local spinlock of the multiple local spinlocks associated with the global spinlock, decision block 532 may be followed by block 536, where spinlock utilization module 210 attempts to acquire another local spinlock associated with the global spinlock. In some embodiments, this other local spinlock is also randomly selected from amongst the multiple remaining local spinlocks associated with the global spinlock. Block 536 may be followed by decision block 516, which operation is described above.

Figure 6:
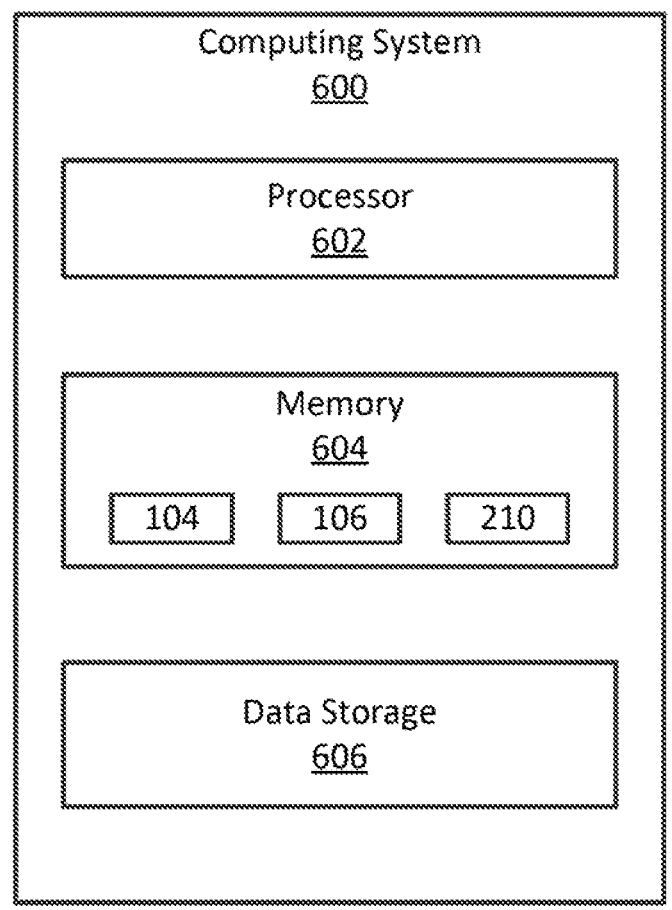
FIG. 6 illustrates selected components of an example computing system that may be used to perform any of the techniques as variously described in the present disclosure, in accordance with at least some embodiments described herein.

FIG. 6 illustrates selected components of an example computing system 600 that may be used to perform any of the techniques as variously described in this disclosure. In some embodiments, computing system 600 may be configured to implement or direct one or more operations associated with some or all of the components and/or modules associated with the scalable spinlocks of FIG. 1. For example, spinlock utilization module 210, global spinlock 104, local spinlocks 106, or any combination of these may be implemented in and/or using computing system 600. In one example case, for instance, each of spinlock utilization module 210, global spinlock 104, and local spinlocks 106 is loaded in a memory 604 and executable by a processor 602. Computing system 600 may be any computer system, such as a workstation, a server, or other form of computing or telecommunications device that employs multiple sockets and is capable of communication and that has sufficient processor power and memory capacity to perform the operations described in this disclosure. A distributed computational system may be provided that includes a multiple of such computing devices. As depicted, computing system 600 may include a processor 602, memory 604, and a data storage 606. Processor 602, memory 604, and data storage 606 may be communicatively coupled.

In general, processor 602 may include any suitable special-purpose or general-purpose computer, computing entity, or computing or processing device including various computer hardware, firmware, or software modules, and may be configured to execute instructions, such as program instructions, stored on any applicable computer-readable storage media. For example, processor 602 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. In some embodiments, processor 602 includes any suitable single core or multi-core processor suitable for use in a multi-socket system, including processor 204. Although illustrated as a single processor in FIG. 6, processor 602 may include any number of processors and/or processor cores configured to, individually or collectively, perform or direct performance of any number of operations described in the present disclosure. Additionally, one or more of the processors may be present on one or more different electronic devices, such as different servers.

In some embodiments, processor 602 may be configured to interpret and/or execute program instructions and/or process data stored in memory 604, data storage 606, or memory 604 and data storage 606. In some embodiments, processor 602 may fetch program instructions from data storage 606 and load the program instructions in memory 604. After the program instructions are loaded into memory 604, processor 602 may execute the program instructions.

For example, in some embodiments, any one or more of the components and/or modules of the scalable spinlocks, including spinlock utilization module 210, may be included in data storage 606 as program instructions. Processor 602 may fetch some or all of the program instructions from the data storage 606 and may load the fetched program instructions in memory 604. Subsequent to loading the program instructions into memory 604, processor 602 may execute the program instructions such that the computing system may implement the operations as directed by the instructions.

In some embodiments, virtualization may be employed in computing device 600 so that infrastructure and resources in computing device 600 may be shared dynamically. For example, a virtual machine may be provided to handle a process running on multiple processors so that the process appears to be using only one computing resource rather than multiple computing resources. Multiple virtual machines may also be used with one processor.

Memory 604 and data storage 606 may include computer-readable storage media for carrying or having computer-executable instructions or data structures stored thereon. Such computer-readable storage media may include any available media that may be accessed by a general-purpose or special-purpose computer, such as processor 602. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 602 to perform a certain operation or group of operations.

Modifications, additions, or omissions may be made to computing system 600 without departing from the scope of the present disclosure. For example, in some embodiments, computing system 600 may include any number of other components that may not be explicitly illustrated or described herein.

As indicated above, the embodiments described in the present disclosure may include the use of a special purpose or a general purpose computer (e.g., processor 602 of FIG. 6) including various computer hardware or software modules, as discussed in greater detail herein. Further, as indicated above, embodiments described in the present disclosure may be implemented using computer-readable media (e.g., memory 604 of FIG. 6) for carrying or having computer-executable instructions or data structures stored thereon.

Example Embodiments

The following examples pertain to further embodiments, from which numerous permutations and configurations will be apparent.

Example 1 is a computer system configured for scalable latches for non-uniform memory access. The system includes multiple sockets, where each socket of the multiple sockets includes at least one central processing unit (CPU) and locally attached memory, wherein each CPU in each socket is communicatively coupled to the locally attached memory of the socket; a global spinlock configured to control access to a shareable resource, the global spinlock including a first flag and a second flag; and multiple local spinlocks, each local spinlock of the multiple local spinlocks configured to control access to the global spinlock; wherein the first flag indicates whether the global spinlock is globally acquired, and the second flag indicates whether the global spinlock is locally acquired.

Example 2 includes the subject matter of Example 1, wherein the multiple local spinlocks and the multiple sockets are same in number, and each local spinlock of the multiple local spinlocks is allocated on a respective socket of the multiple sockets.

Example 3 includes the subject matter of Example 1, wherein the multiple local spinlocks are equally distributed amongst the multiple sockets.

Example 4 includes the subject matter of any of Examples 1 through 3, wherein each local spinlock is a test-and-set spinlock.

Example 5 includes the subject matter of any of Examples 1 through 3, wherein each local spinlock is a test and test-and-set spinlock.

Example 6 includes the subject matter of any of Examples 1 through 6, wherein the global spinlock is permitted to be globally acquired if the first flag indicates that the global spinlock is globally acquired.

Example 7 includes the subject matter of any of Examples 1 through 6, wherein the global spinlock is not permitted to be globally acquired if the second flag indicates that the global spinlock is locally acquired.

Example 8 includes the subject matter of any of Examples 1 through 7, wherein the global spinlock is acquirable only though a local spinlock of the multiple local spinlocks if the second flag indicates that the global spinlock is locally acquired.

Example 9 is a computer-implemented method to control access to a shareable resource. The method includes allocating a global spinlock configured to control access to a shareable resource, the global spinlock including a first flag and a second flag; and allocating multiple local spinlocks, each local spinlock of the multiple local spinlocks configured to control access to the global spinlock; wherein the first flag indicates whether the global spinlock is globally acquired, and the second flag indicates whether the global spinlock is locally acquired.

Example 10 includes the subject matter of Example 9, wherein the global spinlock is allocated on one socket of multiple sockets.

Example 11 includes the subject matter of Example 10, wherein the multiple local spinlocks and the multiple sockets are same in number, and each local spinlock of the multiple local spinlocks is allocated on a respective socket of the multiple sockets.

Example 12 includes the subject matter of Example 10, wherein the multiple local spinlocks are distributed amongst the multiple sockets.

Example 13 includes the subject matter of any of Examples 9 through 12, wherein the global spinlock is a test-and-set spinlock.

Example 14 includes the subject matter of any of Examples 9 through 12, wherein the global spinlock is a test and test-and-set spinlock.

Example 15 includes the subject matter of any of Examples 9 through 14, further including, in response to globally acquiring the global spinlock, setting the first flag to indicate that the global spinlock is globally acquired.

Example 16 includes the subject matter of any of Examples 9 through 15, further including, in response to determining that the first flag indicates that the global spinlock is globally acquired, attempting to globally acquire the global spinlock.

Example 17 includes the subject matter of any of Examples 9 through 16, further including, in response to spinning a first specific number of times attempting to globally acquire the global spinlock without acquiring the global spinlock, attempting to acquire a first local spinlock of the multiple local spinlocks.

Example 18 includes the subject matter of Example 17, wherein the first local spinlock is randomly selected.

Example 19 includes the subject matter of any of Examples 17 and 18, further including, in response to acquiring the first local spinlock, attempting to locally acquire the global spinlock.

Example 20 includes the subject matter of Example 19, further including, in response to locally acquiring the global spinlock, setting the second flag to indicate that the global spinlock is locally acquired.

Example 21 includes the subject matter of any of Examples 17 and 18, further including, in response to spinning a second specific number of times attempting to acquire the first local spinlock without acquiring the first local spinlock, attempting to acquire a second local spinlock of the multiple local spinlocks.

Example 22 includes the subject matter of Example 21, wherein the second local spinlock is randomly selected.

Example 23 includes the subject matter of any of Examples 9 through 16, further including, in response to determining that the second flag indicates that the global spinlock is locally acquired, attempting to acquire a first local spinlock of the multiple local spinlocks.

Example 24 is a computer program product including one or more non-transitory machine readable mediums encoded with instructions that when executed by one or more processors cause a process to be carried out to control access to a shareable resource. The process includes allocating a global spinlock configured to control access to a shareable resource, the global spinlock comprising a first flag and a second flag; and allocating multiple local spinlocks, each local spinlock of the multiple local spinlocks configured to control access to the global spinlock; wherein the first flag indicates whether the global spinlock is globally acquired, and the second flag indicates whether the global spinlock is locally acquired.

Example 25 includes the subject matter of Example 24, wherein the shareable resource is part of a non-uniform memory access (NUMA) system.

Example 26 includes the subject matter of Example 25, wherein the NUMA system comprises multiple sockets, and the global spinlock is allocated on one socket of the multiple sockets.

Example 27 includes the subject matter of Example 26, wherein the multiple local spinlocks and the multiple sockets are same in number, and each local spinlock of the multiple local spinlocks is allocated on a respective socket of the multiple sockets.

Example 28 includes the subject matter of Example 26, wherein the multiple local spinlocks are distributed amongst the multiple sockets.

Example 29 includes the subject matter of any of Examples 24 through 28, wherein the global spinlock is a test-and-set spinlock.

Example 30 includes the subject matter of any of Examples 24 through 28, wherein the global spinlock is a test and test-and-set spinlock.

Example 31 includes the subject matter of any of Examples 24 through 30, further including, attempting to globally acquire the global spinlock; and, in response to globally acquiring the global spinlock, setting the first flag to indicate that the global spinlock is globally acquired.

Example 32 includes the subject matter of any of Examples 24 through 31, further including, in response to determining that the first flag indicates that the global spinlock is globally acquired, attempting to globally acquire the global spinlock.

Example 33 includes the subject matter of any of Examples 24 through 32, further including, spinning a first number of times attempting to acquire the global spinlock; and, in response to spinning a first specific number of times attempting to globally acquire the global spinlock without acquiring the global spinlock, attempting to acquire a first local spinlock of the multiple local spinlocks.

Example 34 includes the subject matter of Example 33, wherein the first local spinlock is randomly selected.

Example 35 includes the subject matter of any of Examples 33 and 34, further including, in response to acquiring the first local spinlock, attempting to locally acquire the global spinlock.

Example 36 includes the subject matter of Example 35, further including, in response to locally acquiring the global spinlock, setting the second flag to indicate that the global spinlock is locally acquired.

Example 37 includes the subject matter of any of Examples 33 and 34, further including, in response to spinning a second specific number of times attempting to acquire the first local spinlock without acquiring the first local spinlock, attempting to acquire a second local spinlock of the multiple spinlocks.

Example 38 includes the subject matter of Example 37, wherein the second local spinlock is randomly selected.

Example 39 includes the subject matter of any of Examples 24 and 32, further including, in response to determining that the second flag indicates that the global spinlock is locally acquired, attempting to acquire a first local spinlock of the multiple local spinlocks.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer system comprising:
a plurality of sockets, each socket of the plurality of sockets comprising at least one central processing unit (CPU) and locally attached memory, wherein each CPU in each socket is communicatively coupled to the locally attached memory of the socket;
a global spinlock configured to control access to a shareable resource, the global spinlock comprising a first flag and a second flag; and
a plurality of local spinlocks, each local spinlock of the plurality of local spinlocks configured to control access to the global spinlock;
wherein the first flag indicates whether the global spinlock is directly acquired, and the second flag indicates whether the global spinlock is acquired through a local spinlock configured to control access to the global spinlock.

2. The system of claim 1, wherein the plurality of local spinlocks and the plurality of sockets are same in number, and each local spinlock of the plurality of local spinlocks is allocated on a respective socket of the plurality of sockets.

3. The system of claim 1, wherein the plurality of local spinlocks are equally distributed amongst the plurality of sockets.

4. The system of claim 1, wherein each local spinlock is a test-and-set spinlock.

5. The system of claim 1, wherein each local spinlock is a test and test-and-set spinlock.

6. The system of claim 1, wherein the global spinlock is permitted to be globally acquired if the first flag indicates that the global spinlock is directly acquired.

7. The system of claim 1, wherein the global spinlock is not permitted to be globally acquired if the second flag indicates that the global spinlock is acquired through a local spinlock configured to control access to the global spinlock.

8. The system of claim 1, wherein the global spinlock is acquirable only through a local spinlock of the plurality of local spinlocks if the second flag indicates that the global spinlock is acquired through a local spinlock configured to control access to the global spinlock.

9. A computer-implemented method to control access to a shareable resource, the method comprising:
   allocating a global spinlock configured to control access to a shareable resource, the global spinlock comprising a first flag and a second flag; and
   allocating a plurality of local spinlocks, each local spinlock of the plurality of local spinlocks configured to control access to the global spinlock;
   wherein the first flag indicates whether the global spinlock is directly acquired, and the second flag indicates whether the global spinlock is acquired through a local spinlock configured to control access to the global spinlock.

10. The method of claim 9, wherein the global spinlock is allocated on one socket of a plurality of sockets.

11. The method of claim 10, wherein the plurality of local spinlocks and the plurality of sockets are same in number, and each local spinlock of the plurality of local spinlocks is allocated on a respective socket of the plurality of sockets.

12. The method of claim 10, wherein the plurality of local spinlocks are distributed amongst the plurality of sockets.

13. The method of claim 9, wherein the global spinlock is one of a test and test-and-set spinlock or a test-and-set spinlock.

14. The method of claim 9, further comprising:
   in response to globally acquiring the global spinlock, setting the first flag to indicate that the global spinlock is directly acquired.

15. The method of claim 9, further comprising:
   in response to determining that the first flag indicates that the global spinlock is directly acquired, attempting to globally acquire the global spinlock.

16. The method of claim 15, further comprising:
   in response to spinning a first specific number of times attempting to globally acquire the global spinlock without acquiring the global spinlock, attempting to acquire a first local spinlock of the plurality of local spinlocks, wherein the first local spinlock is randomly selected.

17. The method of claim 16, further comprising:
   in response to acquiring the first local spinlock, attempting to locally acquire the global spinlock.

18. The method of claim 17, further comprising:
   in response to locally acquiring the global spinlock, setting the second flag to indicate that the global spinlock is acquired through a local spinlock configured to control access to the global spinlock.

19. The method of claim 16, further comprising:
   in response to spinning a second specific number of times attempting to acquire the first local spinlock without acquiring the first local spinlock, attempting to acquire a second local spinlock of the plurality of local spinlocks, wherein the second local spinlock is randomly selected.

20. The method of claim 9, further comprising:
   in response to determining that the second flag indicates that the global spinlock is acquired through a local spinlock configured to control access to the global spinlock, attempting to acquire a first local spinlock of the plurality of local spinlocks.

21. A computer program product including one or more non-transitory machine readable mediums encoded with instructions that when executed by one or more processors cause a process to be carried out to control access to a shareable resource, the process comprising:
   allocating a global spinlock configured to control access to a shareable resource, the global spinlock comprising a first flag and a second flag; and
   allocating a plurality of local spinlocks, each local spinlock of the plurality of local spinlocks configured to control access to the global spinlock;
   wherein the first flag indicates whether the global spinlock is directly acquired, and the second flag indicates whether the global spinlock is acquired through a local spinlock configured to control access to the global spinlock.

22. The computer program product of claim 21, the process further comprising:
   attempting to globally acquire the global spinlock; and
   in response to globally acquiring the global spinlock, setting the first flag to indicate that the global spinlock is directly acquired.

23. The computer program product of claim 21, the process further comprising:
   spinning a first specific number of times attempting to acquire the global spinlock; and
   in response to spinning the first specific number of times attempting to globally acquire the global spinlock without acquiring the global spinlock, attempting to acquire a first local spinlock of the plurality of local spinlocks.

24. The computer program product of claim 23, the process further comprising:
   in response to acquiring the first local spinlock, attempting to locally acquire the global spinlock.

25. The computer program product of claim 24, the process further comprising:
   in response to locally acquiring the global spinlock, setting the second flag to indicate that the global spinlock is acquired through a local spinlock configured to control access to the global spinlock.

* * * * *